2,724,796
CONTROL SYSTEM FOR ELECTRIC MOTOR DRIVEN HOISTS AND THE LIKE

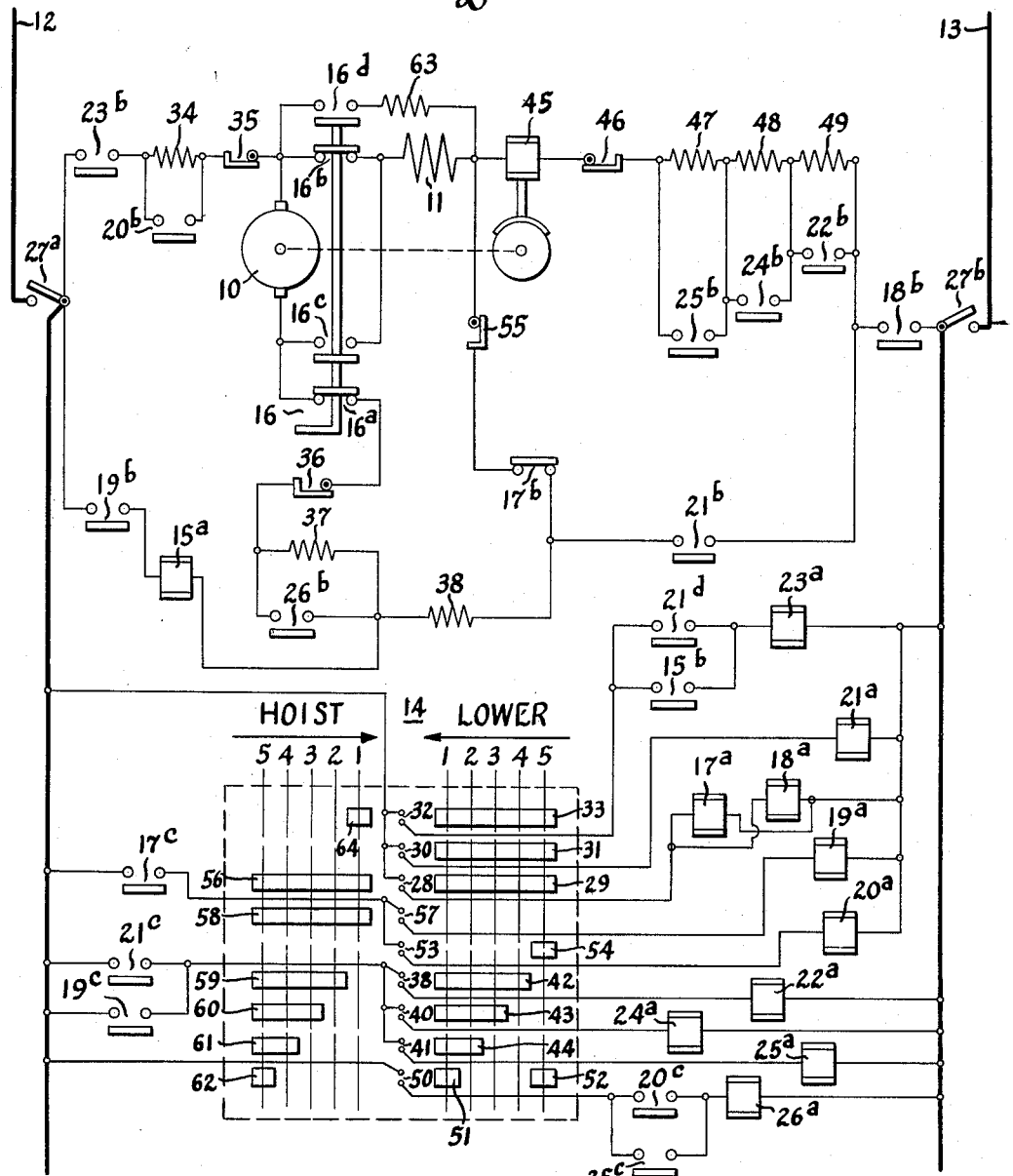

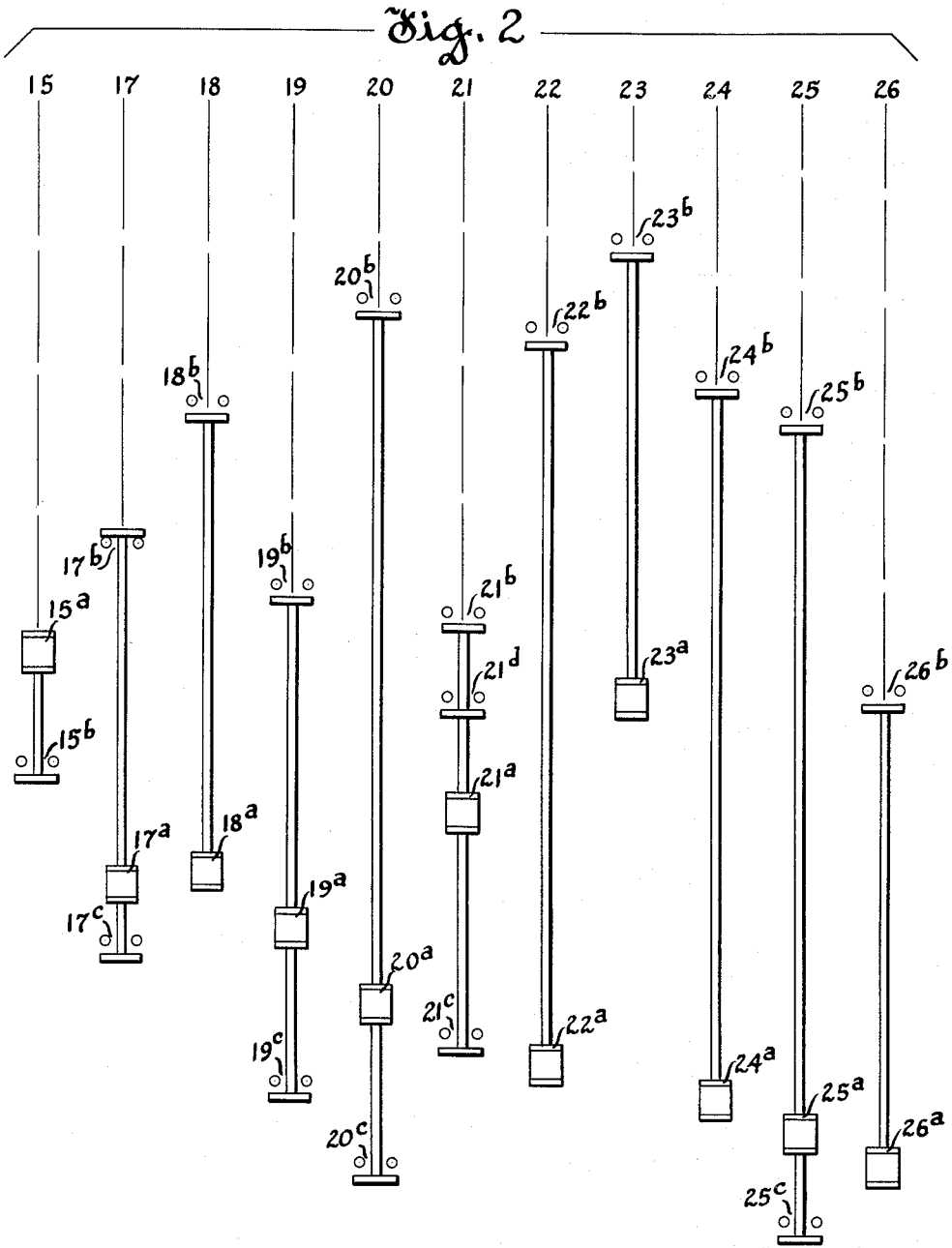

Edward J. Posselt, Oconomowoc, and Edwin W. Seeger, Wauwatosa, Wis., assignors to Cutler-Hammer, Inc., Milwaukee, Wis., a corporation of Delaware Application December 26, 1952, Serial No. 328,006

7 Claims. (Cl. 318—250)

This invention relates to control systems for hoists and the like employing direct current motors, and more particularly relates to systems of the aforementioned type in which a switch is provided to interrupt the hoisting power connection to the motor when the motor is operated beyond a predetermined hoisting limit.

Such an over-hoist limit switch may not be connected in a manner to interrupt the lowering power connection to the motor, inasmuch as the switch, if so connected, would prevent lowering of the hoist from an over-hoisted position. However, it is convenient and common in such control systems to reconnect a resistor, having series connection in the lowering power circuit to the motor armature, in shunt circuit with the motor in certain low speed hoisting positions of the master controller for better speed control.

If, when the resistor is so connected in shunt with the motor, the over-hoist limit switch were to be actuated to disconnect the hoisting power connection to the motor and reverse the armature connections for plugging the motor the motor would be energized through the resistance for operation in its lowering direction. When the hoist had been lowered to a predetermined degree the over-hoist limit switch would be reset to connect the motor for operation in the hoisting direction until the limit switch was again actuated and the cycle would be repeated.

Various circuit arrangements have been used in the past to prevent such undesired operation and the undue stress upon the hoist cables resulting therefrom. The arrangements heretofore used, however, require additional trolley rails and resistors, or require relays which must be operated within certain degrees of excitation and which are not "fail-safe."

Accordingly it is a primary object of this invention to provide a control system for hoists and the like which includes satisfactory over-hoist protection and slow speed control in hoisting, and which will be stable and safe in operation and will have none of the objectionable characteristics aforementioned.

A further object of the invention is to provide such a system which will be reliable yet inexpensive to manufacture and maintain.

Other objects and advantages of the invention will hereinafter appear.

In the drawings,

Figure 1 is a line diagram of a control system embodying the invention, and

Fig. 2 is a chart showing, in vertical alinement, the respective coils and contacts of the relay and contactors illustrated in Fig. 1.

The embodiment illustrated in the drawings will now be described, it being understood that the embodiment illustrated is susceptible of various modifications without departing from the spirit of the invention or the scope of the appended claims.

Referring to Fig. 1, there is shown a direct current motor for driving a hoist drum to raise or lower a hook. The motor illustrated comprises an armature 10 and a series field winding 11. Power for the motor may be supplied from any suitable source, such as the direct current supply lines 12 and 13.

The motor is controlled by a multi-position, reversing type, master switch or drum controller 14 comprising conducting segments and pairs of contact fingers, and having five hoisting positions, five lowering positions and an "off" position thereof as illustrated.

The operating coils of the various contactors are energized, when required, through master switch 14 and all of the same are de-energized when switch 14 is in its "off" position. Contacts $16^a$ and $16^b$ of an over-hoist limit switch 16 and dynamic braking contact $17^b$ of contactor 17 are normally closed, and all other contacts are normally open, as shown in Figs. 1 and 2.

Coil $17^a$ of contactor 17 is energized in all hoisting and all lowering positions to open dynamic braking contact $17^b$ and close auxiliary contact $17^c$.

Coil $18^a$ of contactor 18 is energized in all hoisting and all lowering positions of switch 14 to close normally open line contact $18^b$.

Coil $19^a$ of contactor 19 is energized in all hoisting positions, provided that auxiliary contact $17^c$ of contactor 17 is closed, to effect closure of hoist contact $19^b$ and auxiliary contact $19^c$.

Coil $20^a$ of contactor 20 is energized in lowering position 5 to close lowering accelerating contact $20^b$ and auxiliary contact $20^c$.

Coil $21^a$ of contactor 21 is energized in all lowering positions to close lowering contact $21^b$ and auxiliary contacts $21^c$ and $21^d$.

Coil $22^a$ of accelerating contactor 22 is energized in hoisting positions 2, 3, 4 and 5 and in lowering positions 1, 2, 3 and 4, provided that one of the auxiliary contacts $19^c$ of contactor 19 or $21^c$ of contactor 21 is closed, to effect closure of accelerating contact $22^b$.

Coil $23^a$ of lowering contactor 23 is energized in hoisting position 1 and in all lowering positions, provided that auxiliary contact $21^d$ of contactor 21 or contact $15^b$ of relay 15 is closed, to effect closure of lowering contact $23^b$.

Coil $24^a$ of accelerating contactor 24 is energized in hoisting positions 3, 4 and 5 and in lowering positions 1, 2 and 3 provided that one of auxiliary contacts $19^c$ of contactor 19 or $21^c$ of contactor 21 is closed, to effect closure of accelerating contact $24^b$.

Coil $25^a$ of accelerating contactor 25 is energized in hoisting positions 4 and 5 and in lowering positions 1 and 2, provided that one of auxiliary contacts $19^c$ of contactor 19 or $21^c$ of contactor 21 is closed, to effect closure of accelerating contact $25^b$ and auxiliary contact $25^c$.

Coil $26^a$ of contactor 26 is energized in hoisting position 5 and lowering positions 1 and 5, provided that one of auxiliary contacts $20^c$ of contactor 20 or $25^c$ of contactor 25 is closed, to effect closure of accelerating contact $26^b$.

Normally closed contacts $16^a$ and $16^b$ and normally open contacts $16^c$ and $16^d$ form part of an over-hoist limit switch 16 which is mechanically actuated when the hoist hook is raised above a predetermined safe limit and resets, or returns to its normal position, when the hook is lowered below that limit.

The operation of the system in all lowering positions of master switch 14, with knife switches $27^a$ and $27^b$ closed, is as follows: in all lowering positions of switch 14, coils $17^a$ and $18^a$ are energized through fingers 28 and segment 29 to open dynamic braking contact $17^b$ and close line contact $18^b$ and auxiliary contact $17^c$. In addition, coil $21^a$ is energized through fingers 30 and segment 31 to close lowering contact $21^b$ and auxiliary contacts $21^c$ and $21^d$. When closed the contact $21^d$ permits energization of coil $23^a$ through fingers 32 and segment 33 to close lowering contact $23^b$. The motor circuit for lowering is thus completed, and current flows from line 12 through knife switch $27^a$; contact $23^b$; a resistor 34; a trolley collector rail 35; armature 10; a lowering armature circuit comprising over-hoist limit switch contact 16ª, trolley collector rail 36, a resistor 37, a resistor 38, and contact 21ᵇ; line contact 18ᵇ and knife switch 27ᵇ to line 13.

In lowering position 1 contacts 22ᵇ, 24ᵇ and 25ᵇ are closed by energization of their respective operating coils 22ª, 24ª and 25ª through fingers 38, 40 and 41 and segments 42, 43 and 44 respectively. Thus, the series field winding 11 is energized in parallel with the lowering armature circuit and armature 10 through the series circuit comprising over-hoist limit switch contact 16ᵇ, field winding 11, a series brake release winding 45 (the brake releases when winding 45 is energized), a trolley collector rail 46, and accelerating contacts 25ᵇ, 24ᵇ and 22ᵇ. As switch 14 is moved through its several lowering positions, the energization of field winding 11 is varied to vary the lowering speed of the motor by the opening or closing of contacts 25ᵇ, 24ᵇ and 22ᵇ which respectively short-circuit resistors 47, 48 and 49. Additional speed control in lowering is provided by resistor 37, included in the lowering armature circuit in lowering positions 2, 3 and 4, and by resistor 34, included in the lowering power circuit in lowering positions 1, 2, 3 and 4. Resistor 37 is excluded from the circuit when contact 26ᵇ is closed by the energization of coil 26ª through contact 20ᶜ or contact 25ᶜ, fingers 50 and segment 51 or 52. Resistor 34 is excluded from the circuit when contact 20ᵇ is closed by the energization of coil 20ª through fingers 53 and segment 54.

In the "off" position of switch 14, coil 17ª is de-energized and its normally closed contact 17ᵇ closes to form a dynamic braking circuit comprising, in series circuit, contact 17ᵇ, resistor 38, resistor 37, collector rail 36, over-hoist limit switch contact 16ª, armature 10, over-hoist limit switch contact 16ᵇ, series field winding 11 and trolley collector rail 55.

In all hoisting positions of switch 14 the operating coils 17ª and 18ª are simultaneously energized from the supply lines 12 and 13 through fingers 28 and segment 56 whereupon dynamic braking contact 17ᵇ is opened and line contact 18ᵇ and auxiliary contact 17ᶜ are closed. The closing of the latter completes the circuit for energization of coil 19ª through fingers 57 and segment 58 to close hoisting contact 19ᵇ and auxiliary contact 19ᶜ. The motor circuit is thus completed and current flows from line 12 through knife switch 27ª; a hoisting armature circuit comprising contact 19ᵇ, coil 15ª, resistor 37, trolley collector rail 36 and over-hoist limit switch contact 16ª; armature 10, over-hoist limit switch contact 16ᵇ; series field 11; series brake release winding 45; trolley collector rail 46; accelerating resistors 47, 48 and 49; line contact 18ᵇ; and knife switch 27ᵇ to line 13.

Auxiliary contact 19ᶜ having been closed, rotation of switch 14 to hoisting position 2 (the operation of the system in hoisting position 1 will be hereinafter described) results in the energization, through fingers 38 and segment 59, of coil 22ª to close accelerating contact 22ᵇ which short-circuits accelerating resistor 49. Similarly, in hoisting position 3 coil 24ª is energized through fingers 40 and segment 60 to close accelerating contact 24ᵇ, which then short-circuits accelerating resistor 48. In hoisting position 4, the accelerating resistor 47 is short-circuited by contact 25ᵇ which is closed by the energization of coil 25ª through fingers 41 and segment 61. In hoisting position 5, coil 26ª is energized through fingers 50, segment 62 and closed contact 25ᶜ to effect closure of contact 26ᵇ which then short-circuits accelerating resistor 37.

To provide for stable slow speed operation when hoisting light loads, provision is made, in the circuit selected for illustration, for closing contact 23ᵇ in hoisting position 1 so that resistor 34 is connected in shunt circuit with the series circuit comprising armature 10 and resistor 37 through hoisting contact 19ᵇ.

If the hook is raised above a predetermined safe limit, the over-hoist limit switch will be actuated and its contacts 16ª and 16ᵇ will open to prevent the energization, through the hoisting armature circuit, of armature 10, field winding 11 and brake winding 45. At the same time contacts 16ᶜ and 16ᵈ close to form a dynamic braking circuit comprising contacts 16ᶜ, field winding 11, a dynamic braking resistor 63, contacts 16ᵈ, and armature 10. This operation of the over-hoist limit switch 16 reverses the normal relation of the field winding 11 with respect to armature 10 so that the motor operates as a series generator. The motor will thus be rapidly brought to a stop by dynamic braking action. If, at the same time, master switch 14 is in hoisting position 1 so that coil 23ª is energized through fingers 32 and segment 64 to close contact 23ᵇ, then current will flow from line 12 through knife switch 27ª, contact 23ᵇ, resistor 34, trolley collector rail 35, armature 10, contact 16ᵇ, series field winding 11, brake winding 45, trolley collector rail 46, resistors 47, 48 and 49, contact 18ᵇ, and knife switch 27ᵇ to line 13. Thus the series brake is released, the motor is energized as a series motor for lowering, and the hook is lowered. When the hook is lowered to a predetermined degree, the over-hoist limit switch 16 is reset and its contacts are returned to their normal position. With such an arrangement, if the master switch 14 were permitted to remain in hoisting position 1 so that hoisting contact 19ᵇ remains closed, the motor would then be rapidly reversed and again would raise the hook beyond the safe limit and the cycle would be repeated.

To prevent such cyclic hoisting and lowering of the hook, coil 15ª of relay 15 is inserted in the hoisting armature circuit between hoist contact 19ᵇ and resistor 37. Normally open contact 15ᵇ of relay 15 is connected in series with coil 23ª and in parallel with auxiliary contact 21ᵈ. In hoisting position 1, contact 21ᵈ is open and coil 23ª can only be energized through fingers 32 and segment 64 when contact 15ᵇ is closed. Contact 15ᵇ is closed only when coil 15ª is energized; and consequently if the hook is raised above the safe limit, contact 16ª will open to open the hoisting armature circuit and de-energize coil 15ª. This causes contact 15ᵇ to be opened, coil 23ª to be de-energized, and contacts 23ᵇ to open. When contact 23ᵇ is open and when the over-hoist limit switch is actuated, the motor is not energized, the hook is not driven downward and the brake remains de-energized to hold the hook and load in over-hoisted position until the master switch 14 is moved to a lowering position. This arrangement permits the use of resistor 34 as an armature shunt in the first hoisting position without the possibility of the cycling hereinbefore described, without the need for an additional trolley collector rail and without interruption of the normal operation of the series brake. Moreover, the arrangement described permits the use of shunt resistor 34 in hoisting positions other than the first by the extension of segment 64 to other master control switch positions as desired. Since contacts 23ᵇ and 15ᵇ are both normally open, their failure or failure of their operating coils will not prevent, but instead will provide for, attainment of all of the safety features described.

Coil 15ª, while shown connected between hoist contact 19ᵇ and resistor 37, may be connected at any point in the hoisting armature circuit between knife switch 27ª and contact 16ª. If preferred, a voltage operated coil may be substituted for the series coil 15ª and connected in parallel with resistor 37.

Relay 15 is not required during lowering operation of the hoist. Therefore, it may be inserted in series with contact 19ᵇ between knife switch 27ª and resistor 37 as herein disclosed. When so arranged it will not be energized while the master switch is in a lowering position.

We claim:
1. In a control system for a direct current hoist motor having an armature and a field winding, said system being of the type having a hoisting armature circuit connected to one terminal of said armature, said field winding being connected to the other terminal of said armature, and an over-hoist limit switch responsive to operation of said motor beyond a predetermined limit to interrupt said hoisting armature circuit and to reconnect said field winding of said motor to said one terminal of said armature for dynamic braking operation of said motor, and further being of the type having a resistor connected in shunt circuit with said armature during hoisting operation of said motor, the combination of, a contactor in series with said shunt resistor, and means including a relay connected in said hoisting armature circuit to be subjected to armature current during hoisting and responsive to interruption of said hoisting armature circuit by said over-hoist limit switch to open said contactor and interrupt said shunt circuit.

2. In a control system for energization from a unidirectional current source of supply and having a motor comprising an armature and a field winding for connection from one terminal of said armature to one side of said supply, the combination of, a series circuit for connection from said one terminal of said armature to the other side of said source of supply and comprising a contactor and a resistor, means responsive to operation of said motor beyond a predetermined limit to connect said field winding in parallel circuit with said armature for dynamic braking operation of said motor, another circuit for connection from the other terminal of said armature to said other side of said source of supply and comprising a switch responsive to operation of said motor beyond a predetermined limit to interrupt said other circuit, and means including a relay connected in said other circuit to be subjected to current flow in said circuit and responsive to interruption thereof to open said contactor to interrupt said first-mentioned series circuit.

3. In combination, a motor having an armature and a field winding for connection between one terminal of said armature and one side of a unidirectional current source of supply, a resistor and a lowering contact connected in series circuit for connection from said armature terminal to the other side of said source of supply, a hoisting armature circuit for connection from said other side of said source of supply to the other terminal of said armature and comprising a switch responsive to operation of said motor beyond a predetermined limit to interrupt said hoisting armature circuit, switch means responsive to operation of said motor beyond said predetermined limit to reconnect said field winding to said other terminal of said armature and to effect dynamic braking of the motor, and means including a relay connected in said hoisting armature circuit to be subjected to armature current during hoisting and responsive to interruption of said hoisting armature circuit to effect operation of said lowering contact to interrupt said series circuit.

4. In a control system for a direct current hoist motor having an armature and a field winding, said system being of the type having a hoisting armature circuit connected to one terminal of said armature, said field winding being connected to the other terminal of said armature, and an over-hoist limit switch responsive to operation of said motor beyond a predetermined limit to interrupt the hoisting armature circuit and to reconnect said field winding of said motor to said one terminal of said armature for dynamic braking operation of said motor, and further being of the type having a resistor connected in shunt circuit with said motor during hoisting operation of said motor, the combination of, a contactor in series with said shunt resistor, and means including a relay connected in said hoisting armature circuit to be subjected to armature current during hoisting and responsive to interruption of said hoisting armature circuit by said over-hoist limit switch to open said contactor and interrupt said shunt circuit.

5. In a control system for a direct current hoist motor having an armature and a field winding, said system being of the type having a hoisting armature circuit connected to one terminal of said armature, said field winding being connected to the other terminal of said armature, and an over-hoist limit switch responsive to operation of said motor beyond a predetermined limit to interrupt said hoisting armature circuit and to reconnect said field winding of said motor to said one terminal of said armature for dynamic braking operation of said motor, and further being of the type having a resistor connected in shunt circuit with said armature during hoisting operation of said motor, the combination of, a contactor in series with said shunt resistor, and means including a relay in circuit with said hoisting armature circuit and responsive to interruption of said hoisting armature circuit by said over-hoist limit switch to open said contactor and interrupt said shunt circuit, and a lowering armature circuit for connection to said one terminal of the armature of said motor and comprising a portion of said hoisting armature circuit, said relay being connected in a portion of said hoisting armature circuit not included in said lowering armature circuit.

6. In combination, a motor having an armature and a field winding for connection between one terminal of said armature and one side of a unidirectional current source of supply, a resistor and a lowering contact connected in series circuit for connection from said armature terminal to the other side of said source of supply, a hoisting armature circuit for connection from said other side of said source of supply to the other terminal of said armature and comprising a switch responsive to operation of said motor beyond a predetermined limit to interrupt said hoisting armature circuit, switch means responsive to operation of said motor beyond said predetermined limit to reconnect said field winding to said other terminal of said armature and to effect dynamic braking of the motor, and means including a relay in circuit with said hoisting armature circuit and responsive to interruption of said hoisting armature circuit to effect operation of said lowering contact to interrupt said series circuit, and a lowering armature circuit for connection between said side of said source of supply and said other terminal of said armature and comprising a portion of said hoisting armature circuit, said relay being connected in a portion of said hoisting armature circuit not included in said lowering armature circuit.

7. In combination, a motor having an armature and a field winding for connection between one terminal of said armature and one side of a unidirectional current source of supply, a resistor and a lowering contact connected in series circuit for connection from said armature terminal to the other side of said source of supply, a hoisting armature circuit for connection from said other side of said source of supply to the other terminal of said armature and comprising a switch responsive to operation of said motor beyond a predetermined limit to interrupt said hoisting armature circuit, switch means responsive to operation of said motor beyond said predetermined limit to reconnect said field winding to said other terminal of said armature and to effect dynamic braking of the motor, and means including a relay in circuit with said hoisting armature circuit and responsive to interruption of said hoisting armature circuit to effect operation of said lowering contact to interrupt said series circuit, said last mentioned means comprising an operating coil for connection with said source of supply to close said lowering contact, a normally open contact of said relay in series circuit with said operating coil and the operating coil of said relay, the latter coil having series connection in said hoisting armature circuit.

References Cited in the file of this patent
UNITED STATES PATENTS
2,579,317   Hepperlen et al. _____ Dec. 8, 1951